(12) United States Patent
Berning et al.

(10) Patent No.: US 7,829,230 B2
(45) Date of Patent: Nov. 9, 2010

(54) METHOD FOR OPTIMIZING DIFFUSION MEDIA WITH SPATIALLY VARYING MASS TRANSPORT RESISTANCE

(75) Inventors: Torsten Berning, Mainz (DE); Christian Wieser, Budenheim (DE); Po-Ya Abel Chuang, Honeoye Falls, NY (US); Thomas A. Trabold, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 783 days.

(21) Appl. No.: 11/778,741

(22) Filed: Jul. 17, 2007

(65) Prior Publication Data

US 2009/0024373 A1    Jan. 22, 2009

(51) Int. Cl.
*H01M 8/00*    (2006.01)
(52) U.S. Cl. ................... 429/433; 429/428; 429/512
(58) Field of Classification Search ............ None
See application file for complete search history.

(56) References Cited

U.S. PATENT DOCUMENTS

| | | | |
|---|---|---|---|
| 5,840,438 | A | 11/1998 | Johnson et al. |
| 6,933,067 | B2 | 8/2005 | Kawahara et al. |
| 7,107,864 | B2* | 9/2006 | Roth ............... 73/866 |
| 7,332,240 | B2* | 2/2008 | O'Hara et al. ....... 429/450 |
| 2002/0058173 | A1 | 5/2002 | Alberti et al. |
| 2005/0026018 | A1 | 2/2005 | O'Hara et al. |
| 2007/0065708 | A1 | 3/2007 | Owejan et al. |
| 2007/0111082 | A1* | 5/2007 | Morishita ............... 429/38 |
| 2007/0141405 | A1 | 6/2007 | Lai et al. |

FOREIGN PATENT DOCUMENTS

| | | |
|---|---|---|
| EP | 0 846 347 B1 | 6/2000 |
| JP | 2002042823 A | 2/2002 |
| JP | 2002203571 A | 7/2002 |
| JP | 2006147425 A | 6/2006 |
| KR | 20040014273 | 2/2004 |
| WO | WO 97/08766 | 3/1997 |

OTHER PUBLICATIONS

D. Baker et al. "The Use of Limiting Current to Determine Transport Resistance in PEM Fuel Cells," 210th ECS Meeitng, Abstract #009.

* cited by examiner

*Primary Examiner*—John S Maples
(74) *Attorney, Agent, or Firm*—Fraser Clemens Martin & Miller LLC; J. Douglas Miller (57) ABSTRACT

A method for optimizing a fuel cell diffusion media having a spatially varying mass transport resistance is provided. The method includes at least two passes where a first-pass D/Deff profile for the fuel cell diffusion media is provided and applied to a computational model of the fuel cell having a baseline variable profile. At least one first-pass variable profile resulting from the application of the first-pass D/Deff profile to the computational mode is calculated and compared to a desired variable range. The first-pass D/Deff profile is refined, if necessary, to provide a second-pass D/Deff profile. A relative performance of the fuel cell with a second-pass variable profile resulting from an application of the second-pass D/Deff profile is determined. The second-pass D/Deff profile is refined, if necessary, until the second-pass variable profile has a desirable performance. An effective D/Deff profile is thereby provided.

20 Claims, 4 Drawing Sheets

METHOD FOR OPTIMIZING DIFFUSION MEDIA WITH SPATIALLY VARYING MASS TRANSPORT RESISTANCE

FIELD OF THE INVENTION

The present disclosure relates to fuel cell stacks and, more particularly, to methods for optimizing diffusion media for fuel cell stacks having spatially varying mass transport resistance.

BACKGROUND OF THE INVENTION

An electrochemical fuel cell has been proposed as a clean, efficient and environmentally responsible power source for electric vehicles and various other applications. One example of the fuel cell is the Proton Exchange Membrane (PEM) fuel cell. The PEM fuel cell has a membrane-electrode-assembly (MEA) that typically includes a thin, solid polymer membrane-electrolyte disposed between anode and cathode layers. The anode and cathode layers typically include a finely divided catalyst, usually platinum (Pt), supported on carbon particles and mixed with an ionomer. The anode and cathode layers are sometimes termed catalyst layers (CL). The MEA of the PEM fuel cell is typically characterized by enhanced proton conductivity under wet conditions. Proper water management and humidification are generally required for effective operation of the MEA.

The durability of the MEA strongly depends on the hydration status of the polymer electrolyte membrane used in the MEA. Under typical operating conditions, the MEA cycles through relatively wet and relatively dry states. These membrane hydration cycles are particularly prevalent during fuel cell start-up and shut-down operations and as power demand fluctuates during operation of the fuel cell. One of the consequences of the hydration cycling is a long-term degradation of the mechanical durability of the MEA.

The MEA is generally disposed between a pair of porous conductive materials, also known as gas diffusion media (GDM), which performs a multifunctional role in PEM fuel cells. For example, the GDM distribute gaseous reactants such as hydrogen and oxygen/air, to the anode and cathode layers. The GDM conducts electrons and transfers heat generated at the MEA to a coolant. With respect to water management of the fuel cell, the GDM transports water produced by the electrochemical fuel cell reaction away from the PEM. The water management capability of the GDM is critical to any optimization of fuel cell performance. Oftentimes, the GDM includes a microporous layer (MPL) that provides a transition layer between the MEA electrodes and the GDM. The MPL further assists in water transport from the MEA.

A desirable GDM both maintains membrane electrolyte hydration during dry operating conditions for effective proton conductivity and removes excess water during wet operating conditions, thus militating against flooding of the fuel cell.

As is known in the art, GDM having a spatially varying mass transport resistance may be employed for water management in electrochemical fuel cells. As described in U.S. Pat. No. 6,933,067 to Kawahara et al., a diffusion layer may be sectioned into a plurality of portions, including an upstream portion and a downstream portion. The upstream portion has a structure for preventing a drying-up of the fuel cell and the downstream portion has a structure for preventing a flooding of the fuel cell. U.S. Pat. App. Pub. No. 2005/0026018 to O'Hara et al. discloses a diffusion media and a scheme for spatially varying parameters of the diffusion media to address issues related to water management. Johnson et al. in European Pat. No. 0846347 and U.S. Pat. No. 5,840,438 report anode and cathode substrates having an in-plane, non-uniform structure that enables controlled transport of reactant toward an electrocatalyst layer and controlled transport of water away from the electrocatalyst layer.

There is a continuing need for a method of selecting diffusion media with spatially varying diffusion resistance, and to optimize fuel cell operating conditions for a desired automotive drive cycle. A method allowing for a minimized inlet relative humidity (RH), enabling drier operation of the fuel cell and employment of electrolyte membranes having a high conductivity for a given RH sensitivity, and improving freeze performance and durability, is also desired.

SUMMARY OF THE INVENTION

In concordance with the instant disclosure a method of selecting diffusion media with spatially varying diffusion resistance, optimizing fuel cell operating conditions for a desired automotive drive cycle, and improving fuel cell performance and durability is surprisingly discovered.

In one embodiment, a method for selecting a fuel cell diffusion media having a spatially varying mass transport resistance is described. The method includes the steps of: a) identifying i) a plurality of operating conditions for a fuel cell in a vehicle, the plurality of operating conditions including a baseline operating condition, ii) at least one fuel cell variable correlated to fuel cell performance, and iii) a desired range of the at least one fuel cell variable; b) determining at least one baseline variable profile for the fuel cell; c) providing a first-pass D/Deff profile for the fuel cell diffusion media; d) applying the first-pass D/Deff profile to a computational model of the fuel cell having the baseline variable profile; e) calculating at least one first-pass variable profile resulting from the application of the first-pass D/Deff profile to the computational model; f) comparing the first-pass variable profile to the desired range of the variable; g) refining the first-pass D/Deff profile if the first-pass variable is not within the desired range, and repeating the steps d) to f) until the first-pass variable profile is within the desired range, wherein a second-pass D/Deff profile is provided; h) determining a plurality of second-pass variable profiles with the second-pass D/Deff profile; i) comparing a relative performance of the fuel cell with the second-pass variable profile and the first-pass variable profile; and j) refining the first-pass D/Deff profile if the performance of the fuel cell with the second-pass variable profile is less desirable than the performance of the fuel cell with the first-pass variable profile, and repeating the steps d) to i) until the fuel cell having the second-pass variable profile has a superior fuel cell performance, wherein an effective D/Deff profile for the fuel cell diffusion media is provided.

In a further embodiment, the steps of determining the first-pass and second-pass variable profiles include calculating the variable profiles with a computational model. The steps of determining the first-pass and second-pass variable profiles also may include preparing the fuel cell having the first-pass and second-pass D/Deff profiles and measuring the first-pass and second-pass variable profiles.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

Figure 1:
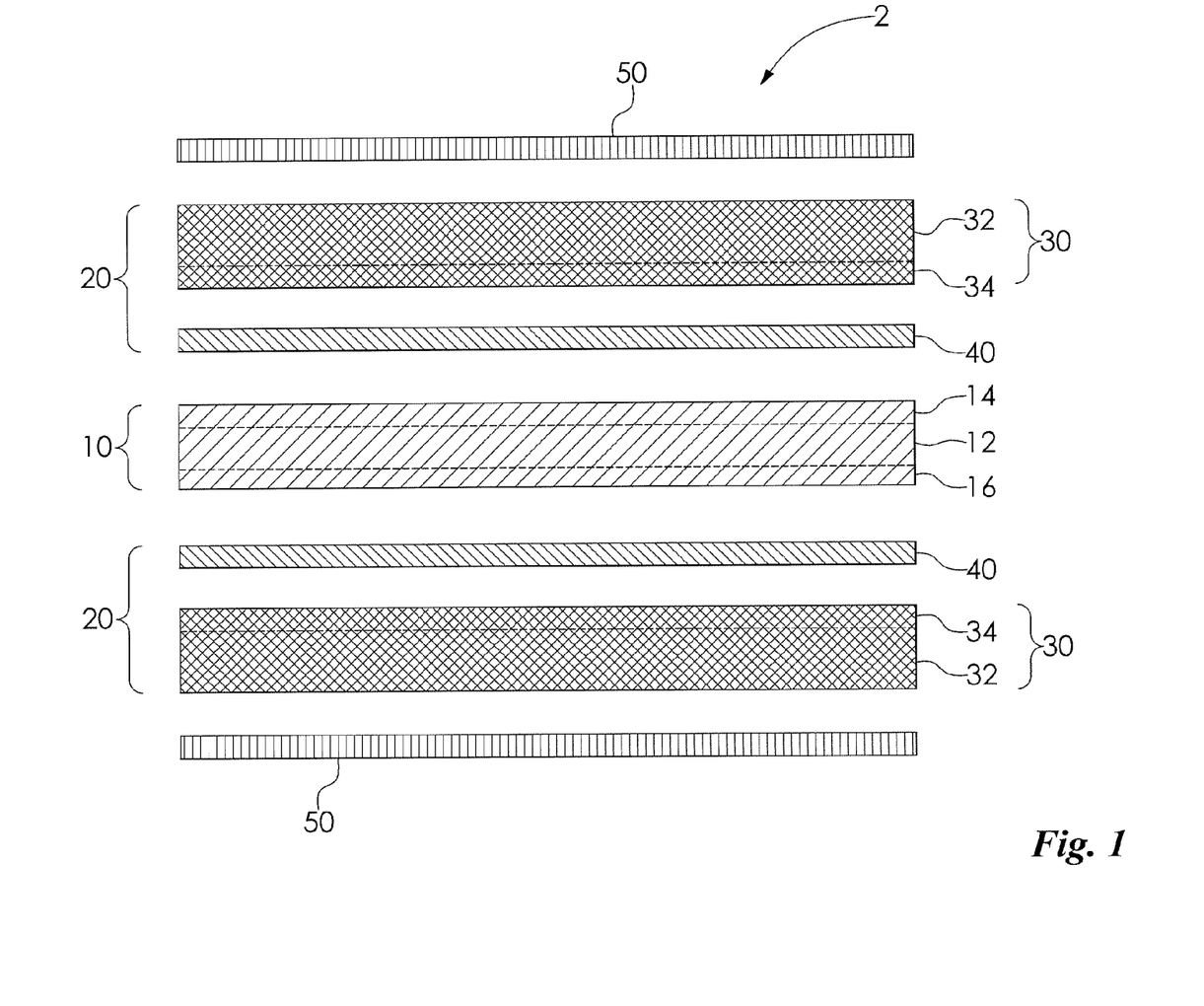
FIG. 1 is an exploded, schematic illustration of a fuel cell according to one embodiment of the present disclosure.

As shown in FIG. 1, an illustrative fuel cell 2 is provided. A skilled artisan should appreciate that other fuel cell designs may be used within the scope of the present disclosure. In practice, the fuel cell 2 is provided in a stack having a plurality of fuel cells 2 connected in electrical series to provide a desired quantity of electrical power, for example, a quantity sufficient to power an electric vehicle.

The illustrative fuel cell 2 includes a membrane electrode assembly (MEA) 10. The MEA 10 includes a polymer-electrolyte membrane 12 as well as an anode 14 and a cathode 16 disposed on opposite sides, known as the anode side and the cathode side, respectively, of the membrane 12. The fuel cell 2 includes diffusion media 20 disposed on opposite sides of the MEA 10. The gas diffusion media 20 include at least one gas diffusion medium (GDM) 30. In a specific embodiment, the GDM 30 includes a substrate 32 having a microporous layer 34 disposed thereon. The gas diffusion media 20 also may include at least one vapor barrier layer 40 disposed on opposite sides of the MEA 10. The vapor barrier layer 40 may be formed integrally with the MEA 10, may envelope the MEA 10, and may be disposed between or attached to at least one of the MEA 10 and the GDM 30. The fuel cell 2 also includes first and second flowfield portions 50 defined on opposite sides of the MEA 10. The flowfield portions 50 are formed on a surface of a fuel cell unipolar or bipolar plate (not shown), for example.

The terms "diffusion media" and "diffusion medium," as used herein, broadly include the GDM 30, the vapor barrier layer 40, and any other layers disposed between the MEA 10 and the flowfield 50 which are commonly used in fuel cells for gas distribution, liquid water management, and electron transport.

The MEA 10 may be hydrated by transporting water from a humidified gas stream in the reactant gas channels of the flow field 50. In addition, the MEA 10 may be humidified by a quantity of water generated at the cathode 16. When the reactant gas flow has lower humidity than the MEA 10, water may be transported from the MEA 10, through the diffusion media 20, to channels in the flowfields 50, resulting in the dehydration of the MEA 10.

The present disclosure contemplates water management of the fuel cell 2 by reducing or optimizing a variation in the water content of MEA 10 between hydration and dehydration states, or by reducing a rate of dehydration and hydration, through control of a mass transport resistance, also known as a mass transfer coefficient (MTC), of the materials between MEA 10 and the flowfields 50. Specifically, the present disclosure includes spatially varying the MTC of the diffusion media 20. It should be appreciated that the MTC may be spatially varied by means available to those of skill in the art, and the methods of varying the MTC may be selected as desired.

As used herein, the term MTC means the ratio of the free diffusion coefficient over the effective diffusion coefficient, as defined by the following equation:

$$MTC = \frac{D}{D_{eff}} h$$

where h is the thickness of the GDM 20 or vapor barrier layer 30; D is the free gas-phase diffusivity; and Deff is the effective diffusivity in the diffusion media 20. As the MTC increases, the rate of vapor transport decreases, which results in a reduced rate of change in hydration/dehydration of the MEA 10 as the fuel cell 2 operation conditions varies. The ratio of D/Deff is considered to be a material property, which is a function of the porosity, tortuosity, and pore size distribution of the diffusion media 20.

It should be noted that the physics which govern the MTC is the diffusion of water vapor through the diffusion media 20. The diffusion of water vapor is driven by a concentration gradient of the water vapor through the thickness of the diffusion media 20. It should be further noted that the diffusion property is essentially different from permeability. In the physics of permeation, water is transported through the diffusion media 20 by convection. The convection is driven by a pressure gradient through the thickness of the diffusion media 20. In the fuel cell 2, the pressure gradient from the gas flow channels to the MEA 10 is minimal, and the water transport is governed instead by the diffusion of water vapor through the diffusion media 20. The diffusion of water vapor is directly related to the MTC defined herein and known in the art.

In study of the fuel cell 2, oxygen transport is commonly used to obtain D/Deff. As would be familiar to one of ordinary skill in the art, free oxygen diffusivity, $D_{O2}$, can be readily calculated with a known gas composition. On the other hand, effective oxygen diffusivity, $D_{eff,O2}$, can only be obtained from experiment. As a skilled artisan should understand, a limiting current method is the most common experimental test to determine effective oxygen diffusivity and can be written as:

$$D_{eff} = \frac{i_{lim}}{4F} \times \frac{h}{C_{O_2}}$$

where F is the Faraday constant; h is the thickness of the gas diffusive layer; $i_{lim}$ is the limiting current; and $C_{O2}$ is the oxygen concentration in the flowfield. The limiting current method may be performed in the fuel cell 2 with a 5 cm² active area and a high stoichiometry (anode/cathode) to provide uniform cell oxygen concentration, for example. Limiting current can then be measured when the fuel cell 2 is operating at low voltage, e.g. 0.1V.

A desired spatially varied MTC value is obtained by adjusting at least one of a porosity, a tortuosity, a pore-size and a thickness of the diffusion media 20, for example. As used herein, "adjusting" means increasing or reducing the diffusion media 20 porosity, tortuosity, pore-size, thickness, or combinations thereof. In addition to achieving the desired MTC, minimizing the thickness of the diffusion media 20 may reduce the electrical resistance within the fuel cell 2. Tortuosity is defined as the square of the ratio of the effective length of pore channels to the length parallel to the overall direction of the pore channels in the diffusion media 20. Tortuosity can be determined experimentally by using various techniques, such as conductivity and diffusion techniques, ion transit-time techniques and pore-distribution techniques, as would be familiar to one of ordinary skill in the art. A skilled artisan should appreciate that a desired spatially varied MTC value may be achieved by other means that may be employed within the scope of the instant disclosure.

As nonlimiting examples, materials suitable for use in the spatially varying diffusion media 20 of the disclosure may include metal, carbon-based materials, or combinations thereof. In one embodiment, the diffusion media 20 include carbon fibers, sheets, or combinations thereof. It should be understood that other suitable materials may be used as desired.

In further nonlimiting examples, materials operable to produce the desired spatially varying MTC values include graphite flakes, metal foil with holes, and carbon fiber or particles layered with binders to adjust porosity. Typical binders may be hydrophobic and include fluoropolymer, like polytetrafluoroethylene (PTFE), polyvinylidene fluoride (PVDF), polyvinyl fluoride (PVF) and the like, carbon particles, carbonizable thermoset resins, and ionomers.

The diffusion media 20 may have varying thicknesses, for example, the diffusion media 20 has a thickness of up to 100 μm. In further embodiments, the spatially varying MTC diffusion media 20 may have a porosity of between about 20% to about 70%. In another embodiment, the spatially varying MTC diffusion media 20 has a pore-size of between about 10 nm to about 100 μm, for example. In an additional embodiment, the spatially varying MTC diffusion media 20 has a tortuosity of between about 4 to about 10, for example. It should be understood that profiles of thickness, porosity, tortuosity, pore-size, and combinations thereof, as well as MTC-influencing materials and designs, may be used as desired to adjust the MTC of the diffusion media 20.

The present disclosure includes a method for selecting the fuel cell diffusion media 20 having the spatially varying mass transport resistance. In particular, the method facilitates selection of the suitable diffusion media 20 in relation to operating conditions representative of an automotive drive cycle. Thus, the method of the disclosure enables a fuel cell operation with acceptable performance and substantially uniform relative humidity (RH) and current distribution (CD) along a length of the fuel cell 2 by providing a means for selecting an appropriate spatially varying MTC, as indicated by the MTC or D/Deff profile, for at least one of the cathode side and anode side of the fuel cell 2.

Figure 2:
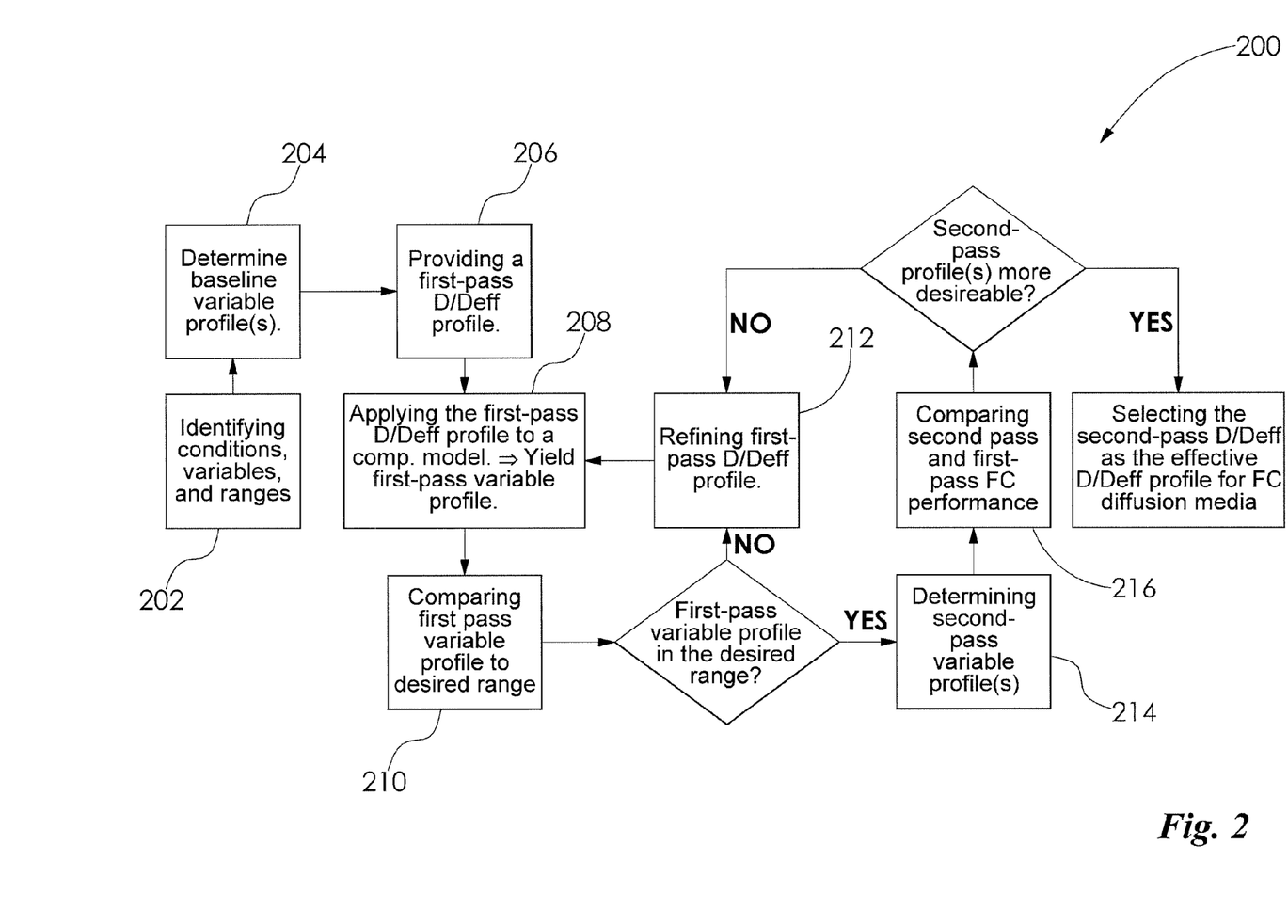
FIG. 2 is a flow-diagram depicting an illustrative sequence of steps for determining an optimum D/Deff profile of a diffusion media for a set of automotive operating conditions.

Referring now to FIG. 2, one embodiment is shown for selecting the fuel cell diffusion media 20 having a spatially varying mass transport resistance. As a nonlimiting example, a method 200 for selecting the fuel cell diffusion media 20 includes a first step 202 of identifying i) a plurality of operating conditions for the fuel cell 2 in a vehicle, the plurality of operating conditions including a baseline operating condition, ii) at least one fuel cell variable correlated to fuel cell performance, and iii) a desired range of the at least one fuel cell variable. Next, the method 200 includes a second step 204 of determining at least one baseline variable profile for the fuel cell 2. The method 200 further includes the third step 206 of providing a first-pass D/Deff profile for the fuel cell diffusion media 20, and a fourth step 208 of applying the first-pass D/Deff profile to a computational model of the fuel cell 2 having the baseline variable profile. Upon application of the first-pass D/Deff profile to the computational model, at least one first-pass variable profile resulting from the application of the first-pass D/Deff profile to the computational model is calculated. The method 200 further includes a fifth step 210 of comparing the first-pass variable profile to the desired range of the variable. Next, the first-pass D/Deff profile is refined in a sixth step 212 if the first-pass variable is not within the desired range, and the steps 210 to 212 repeated until the first-pass variable profile is within the desired range, wherein a second-pass D/Deff profile is provided. The method 200 further includes a seventh step 214 of determining a plurality of second-pass variable profiles with the second-pass D/Deff profile. In an eighth step 216 of the method 200, a relative performance of the fuel cell 2 with the second-pass variable profile and the first-pass variable profile is compared. The first-pass D/Deff profile is then further refined in step 212 if the performance of the fuel cell 2 with the second-pass variable profile is less desirable than the performance of the fuel cell 2 with the first-pass variable profile, and 208 to 216 are repeated until the fuel cell 2 having the second-pass variable profile has a superior fuel cell performance. An effective D/Deff profile for the fuel cell diffusion media 20 is thereby provided. The method of FIG. 2 is further described herein.

The plurality of operating conditions for the fuel cell 2 in the vehicle may be representative of an automotive drive cycle. The automotive drive cycle includes fuel cell start-up and fuel cell operation at vehicle idle, under a uniform vehicle speed, under vehicle acceleration, and operational states therebetween, for example. The automotive drive cycle may also include operation of the vehicle under different vehicle environments, such as acceleration on a graded surface. The operating conditions may also include fuel cell operation conditions as known in the art, for example, an operating temperature, an inlet gas humidity, a pressure, and a cell stoichiometry (anode/cathode). Other operating conditions related to performance of the fuel cell 2 may be included in the plurality of operating conditions as desired.

The plurality of operating conditions representative of an automotive drive cycle include a baseline operating condition. The baseline operating condition is selected as a nominal condition representative of the automotive drive cycle. In certain embodiments, the baseline operating condition is representative of a dry fuel cell, for example, at a temperature between about 60° C. and 100° C., a pressure between about 1 bar to about 2 bars, an inlet relative humidity (RH) between about 15 percent and about 35 percent, and a fuel cell stoichiometry of (anode/cathode) between about 1.25/2 and about 1.75/2. The baseline operating condition may be representative of a fuel cell operating in a vehicle at highway speeds, for example. It should be understood that the baseline operating condition may be identified by a skilled artisan as desired.

In further embodiments, the fuel cell variable includes at least one of relative humidity (RH), current density (CD), high-frequency resistance (HFR), and fuel cell voltage. The fuel cell RH is a measure of the humidity of the fuel cell reactants at a given pressure and temperature. As is known in the art, sufficient gas humidification or RH is essential to fuel cell operation. The CD is a vector-point function describing the magnitude and direction of charge flow per unit area, generally expressed in A/cm². HFR is correlated to hydration or water content of the MEA 10. A higher HFR fluctuation indicates a higher degree of variation in hydration or dehydration of the MEA 10, for example.

The desired range of the at least one fuel cell variable may be identified by one of ordinary skill as desired. Illustrative factors that are considered in identifying the desired ranges may include the effect of the variable fluctuation on fuel cell performance and durability. As nonlimiting examples, the desired variable range includes at least one of a desired fuel cell voltage range, a relative humidity range ($RH_{max}$ minus $RH_{min}$), a current density range ($CD_{max}$ minus $CD_{min}$), and a high-frequency resistance range ($HFR_{max}$ minus $HFR_{min}$). The desired fuel cell voltage range, for example, may be based on a performance metric for a fuel cell system, wherein the metric is designed to provide a desired system efficiency. A minimization of spatial variation in the at least one fuel cell variable across a length of the fuel cell 2 may optimize fuel cell voltage or potential. A minimization of spatial variation in the at least one fuel cell variable may also optimize durability of the fuel cell 2. It should be appreciated that other fuel cell variables relevant to fuel cell performance may also be suitable for use with the instant method.

In certain embodiments, the baseline variable profile is the spatial variation of the fuel cell 2 variable across a length of the fuel cell 2 under the baseline operating condition. The at least one baseline variable profile includes a variation in RH from an inlet region to an outlet region of the fuel cell 2, for example. In particular embodiments, the baseline variable profile is determined for the fuel cell 2 having a uniform D/Deff profile. As a nonlimiting example, the baseline variable profile may be determined by preparing the fuel cell 2 with a substantially uniform D/Deff profile, operating under the baseline operating condition, and measuring variable profile of the fuel cell 2. As a further example, the baseline variable profile may be determined by calculating the baseline variable profile via a computational model of the fuel cell 2 with a substantially uniform D/Deff profile, and simulating the baseline operating condition. Alternative means suitable for determining the baseline variable profile may also be employed.

It should be appreciated that the method of the disclosure includes at least two passes through which an effective D/Deff profile is evaluated prior to use with the diffusion media 20 of the fuel cell 2. The first-pass D/Deff profile for the fuel cell 2 diffusion media 20 may be selected as desired. For example, the D/Deff profile may be selected for at least one of a cathode-side and an anode-side of the fuel cell 2. As a nonlimiting example, on the cathode-side of the fuel cell 2, the first-pass D/Deff profile may decrease in a substantially linear fashion from a cathode inlet region to a cathode outlet region of the fuel cell 2. In another nonlimiting example, the D/Deff profile may decrease rapidly at the cathode inlet region and then decrease gradually across the length of the fuel cell 2 in the direction of the cathode outlet. It should be appreciated that further D/Deff profiles or distributions are also suitable and may be employed as desired.

In one embodiment, the first-pass D/Deff profile is applied to a computational model of the fuel cell 2 having the baseline variable profile. In particular embodiments, the computational model is a multidimensional fuel cell model adapted to process data inputs from a plurality of fuel cell 2 variables and operating conditions and to calculate and output a distribution or profile representing the spatial variation of the fuel cell variable across a length of the fuel cell 2. For example, the calculated profile may be the first-pass and second-pass variable profiles of the method described herein. As a nonlimiting example, the computational model employs a computational fluid dynamics (CFD) code. The computational model also may include the fuel cell 2 electrochemistry. The computational model further may include sub-models related to electron density, heat transport, and other relevant fuel cell 2 parameters.

Following the calculation of the at least one first-pass variable profile from the first-pass D/Deff profile, the first-pass variable profile is compared to the desired range of the variable. In particular embodiments, the first-pass variable profile may be overlaid on the desired range for the variable of interest. In other embodiments, the first-pass variable profile is further processed prior to comparison. For example, a difference between the maximum value and the minimum value of the first-pass variable profile may be calculated and the difference compared to the identified acceptable range of spatial variation for the fuel cell variable. As nonlimiting examples, the first-pass variable profiles may include a relative humidity range ($RH_{max}$ minus $RH_{min}$), a current density range ($CD_{max}$ minus $CD_{min}$), and a high-frequency resistance range ($HFR_{max}$ minus $HFR_{min}$).

Upon comparison of the first-pass variable profile to the desired range, the first-pass variable may be further refined or modified. In one embodiment, when the first-pass variable is not within the desired range, the first-pass D/Deff is refined and again applied to the computational model of the fuel cell 2 having the baseline variable profile. The application of the refined first-pass D/Deff profile results in a further first-pass variable profile for comparison. The refinement and re-comparison of the first-pass D/Deff profile is repeated until the first-pass variable profile is within the desired range. When the first-pass D/Deff profile has been refined to provide a first-pass variable profile within the desired range, the first-pass D/Deff profile is sufficient for further evaluation as the second-pass D/Deff profile.

The second-pass D/Deff profile is used to determine the plurality of second-pass variable profiles. The plurality of second-pass variable profiles relate to the plurality of operating conditions identified in the method of the disclosure, such as a substantially dry or a substantially wet operating conditions, or extreme vehicle operating conditions, for example. As a nonlimiting example, the second-pass variable profiles may result from an application of the second-pass D/Deff profile to the computational model of the fuel cell 2 under the plurality of operating conditions. In a further example, the fuel cell 2 may be prepared with the second-pass D/Deff profile, and the second-pass variable profiles measured under the plurality of operating conditions.

As should be appreciated by one of ordinary skill in the art, the variable profiles of the disclosure are correlated to the performance of the fuel cell 2, for example, the fuel cell 2 potential or durability. Alternative fuel cell 2 performance characteristics may be selected as desired. The fuel cell 2 performance is determined for both the first-pass variable profile and the plurality of second-pass variable profiles. In accordance with the instant method, the relative performance of the fuel cell 2 with the first-pass and second-pass variable profiles is compared.

Following the comparison of the fuel cell performance with the first-pass and second-pass variable profiles, the second-pass D/Deff profile may be further refined. For example, if the overall performance of the fuel cell 2 with the plurality of second-pass variable profiles is less desirable than the performance of the fuel cell 2 with the first-pass variable profile, the first-pass D/Deff profile is refined and reapplied to the computation model. As with the first-pass refinement, the refinement and re-comparison of the first-pass D/Deff profile is repeated until the method yields the second-pass variable profile providing a superior overall fuel cell performance in comparison to the performance with the first-pass variable profile. A skilled artisan should appreciate that the overall superior performance means that the performance of the fuel cell 2 at the plurality of operating conditions is at least acceptable, and for a majority of operating conditions, optimized over the first-pass performance.

When the second-pass D/Deff profile has been refined to provide the plurality of second-pass variable profiles having the acceptable overall performance, the second-pass D/Deff profile is sufficient to be employed in the fuel cell 2 diffusion media 20 as the effective D/Deff profile. The fuel cell 2 diffusion media 20 optimized for the fuel cell 2 and vehicle operating conditions is thereby selected.

Referring now to FIGS. 3 to 6, one example of a spatially varying the diffusion media 20 optimized according to the method of the disclosure is provided. The operating conditions employed in the example are an operating temperature of about 80° C., a pressure of about 1.5 bar, an inlet relative humidity of about 25 percent, a fuel cell stoichiometry (anode/cathode) of about 1.5/2, and an average current density of about 1.5 A/cm2.

Figure 3:
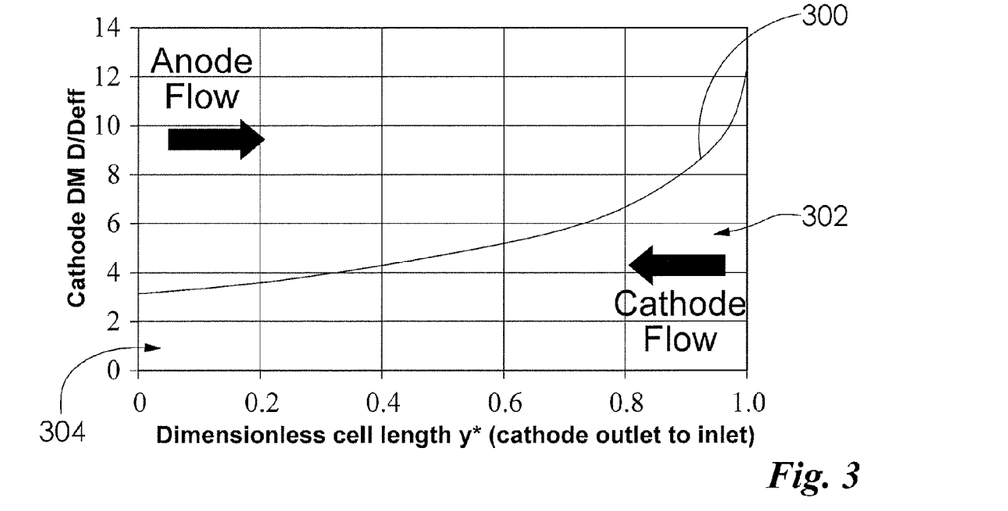
FIG. 3 is a graph showing an illustrative effective mass transport resistance (D/Deff) of a fuel cell GDM, the mass transport resistance decreasing from the cathode inlet to the cathode outlet.

FIG. 3 shows an effective D/Deff profile 300 of mass transport resistance along a length of the fuel cell 2. As shown, the mass transport resistance at a cathode inlet 302 side of the fuel cell 2 is higher than the mass transport resistance at the cathode outlet 304 side of the fuel cell 2. Illustratively, the D/Deff at the cathode inlet is about 12.8, and gradually decreases across the length of the fuel cell 2 to a D/Deff of about 3 at the cathode outlet.

In the embodiments shown in FIGS. 3 to 6, the diffusion media 20 on the cathode side of the fuel cell 2 has spatial MTC variation, with the diffusion media 20 on the anode side having a substantially uniform MTC. It should be understood, however, that spatially varying MTC diffusion media 20 may also be employed on the anode side of the fuel cell 2.

A higher mass transport resistance militates against a removal of product water produced at the MEA 10, and therefore a dehumidification of the MEA 10. In the example shown in FIG. 3, the spatially varying diffusion media 20 militates against a removal of water near the cathode inlet 302, where the water may be primarily present from humidification of cathode inlet gases. The spatially varying diffusion media 20 facilitates a higher rate of water removal as the gases travel across the length of the MEA 10 from cathode inlet 302 to cathode outlet 304. Thus, the water produced by the electrochemical fuel cell reactions at the cathode 16 may be efficiently used to humidify the MEA 10 and removed, militating against a flooding of the fuel cell 2.

Figure 4:
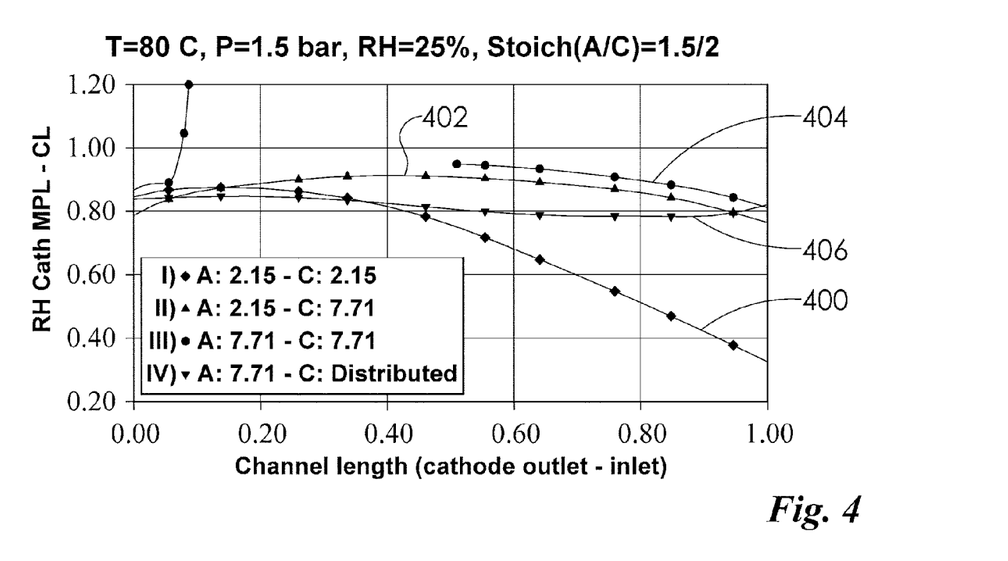
FIG. 4 is a graph showing an illustrative RH distribution at the cathode MPL-CL interface along a length of a fuel cell having diffusion media as shown in FIG. 3.

FIG. 4 shows a simulated RH distribution along a length of the fuel cell 2, and at the interface between the diffusion media 20 and the MEA 10, in four Examples (I to IV). In Example I, the fuel cell 2 has a substantially uniform D/Deff profile of about 2.15 on both the anode 14 and cathode 16 sides of the fuel cell 2, resulting in a first RH profile 400. In Example II, the fuel cell 2 has a substantially uniform D/Deff profile of about 2.15 on the anode 14 side and about 7.71 on the cathode 16 side of the fuel cell 2, resulting in a second RH profile 402. In Example III, the fuel cell 2 has a substantially uniform D/Deff profile of about 7.71 on both the anode 14 and cathode 16 sides of the fuel cell 2, resulting in a third RH profile 404. In Example IV, the fuel cell 2 has a distributed D/Deff profile as shown in FIG. 3 on the cathode 16 side of the fuel cell 2, resulting in a distributed RH profile 406.

In FIG. 4, the distributed RH profile 406 of Example IV is substantially uniform RH across the length of the fuel cell 2. In comparison, Example I exhibits a significantly lower RH at the cathode inlet than at the cathode outlet of the fuel cell 2. Example II exhibits an RH profile that peaks near the center of the fuel cell 2. Example III exhibits an RH profile that is significantly higher past the center of the fuel cell 2, and may result in flooding.

Figure 5:
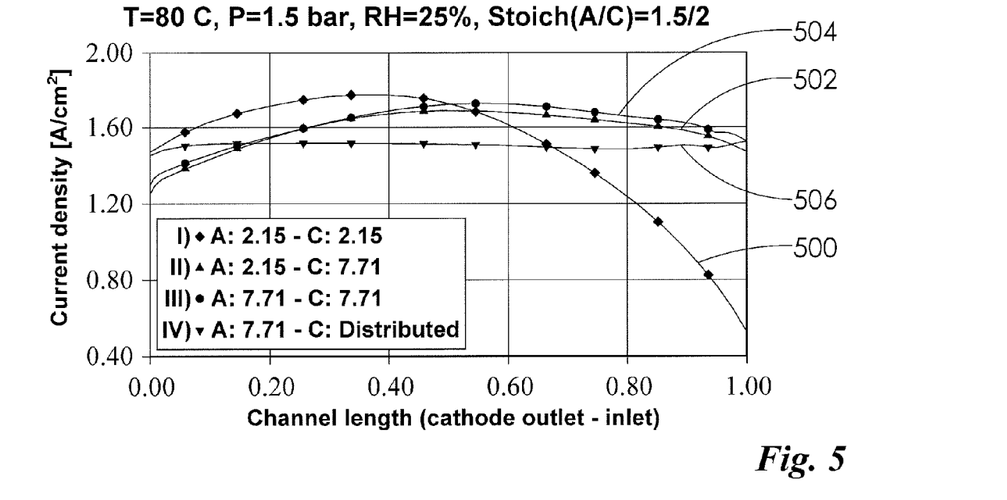
FIG. 5 is a graph showing an illustrative current density distribution along a length of a fuel cell having diffusion media as shown in FIG. 3.

With reference to FIG. 5, a simulated current density (CD) across the length of the fuel cell 2 is shown with respect to Examples I to IV. In Example I, the CD at the cathode inlet is significantly lower than the current density at the cathode outlet. In Examples II and III, the CD is seen to peak near the center of the fuel cell 2 length. In Example IV, having the distributed D/Deff profile, the CD is substantially uniform along the length of the fuel cell 2.

Figure 6:
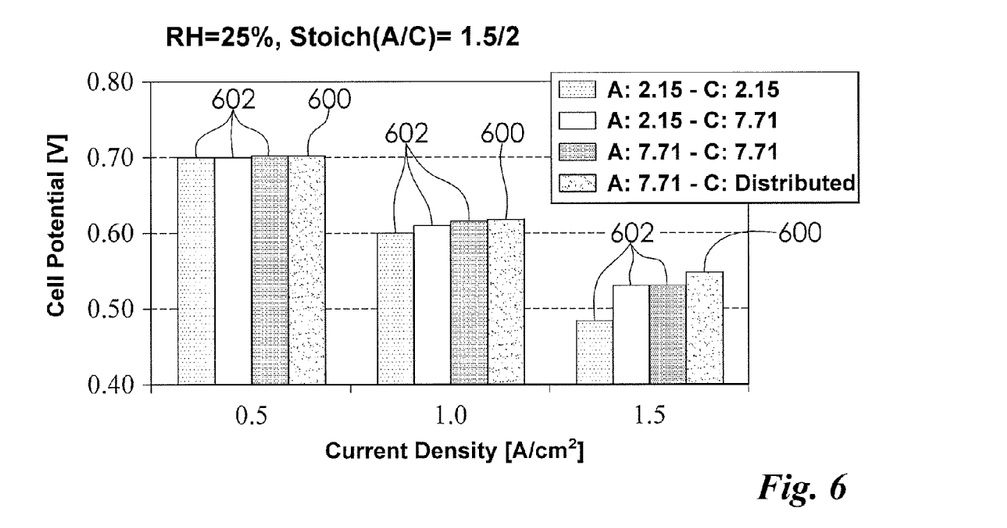
FIG. 6 is a graph showing an illustrative potential of a fuel cell having diffusion media as shown in FIG. 3.

Referring now to FIG. 6, a voltage or potential 600 of the fuel cell 2 having the distributed D/Deff profile is now shown to be equal or superior to the potentials 602 of fuel cells 2 having substantially uniform D/Deff profiles, wherein the various uniform D/Deff profiles are obtained for a substantially constant average, or overall, current density.

It is surprisingly found that a diffusion media 20 having the distributed inlet-to-outlet D/Deff or mass transport resistance promotes a uniformity of RH, CD, and HFR across the length of the fuel cell 2. Flooding of the MEA 10 and the associated catalyst degradation is militated against with the method and selected diffusion media 20 of the disclosure. The substantially uniform RH profile also provides a substantially uniform swelling of the polymer-electrolyte membrane 12 across the length of the fuel cell 2. Uniform membrane swelling leads to a reduction in internal stress on the membrane 12, thereby resulting in enhanced fuel cell durability. Moreover, because the hydration state is much more uniform over the active fuel cell area, potentially damaging local conditions resulting from the accumulation of liquid water in the diffusion media or flow field channels can be avoided. It is thus surprisingly found that the use of diffusion media with distributed mass transport resistance optimizes fuel cell reliability.

The method of the disclosure further provides diffusion media 20 that allow for reduced external humidification by optimizing the use of product water in the fuel cell 2. For example, liquid water at the anode outlet may be responsible for flow maldistribution, resulting in local hydrogen starvation, and is militated against with the method and diffusion media 20 of the disclosure. A drier operation of the fuel cell 2, with membranes 12 having a high conductivity versus RH sensitivity, may also be employed. The optimized use of water in the fuel cell 2 further militates against the formation of liquid water in the fuel cell 2, thereby further improving freeze performance and durability of the fuel cell 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for optimizing a fuel cell diffusion media having a spatially varying mass transport resistance, the method comprising the steps of:
   a) identifying i) a plurality of operating conditions for a fuel cell in a vehicle, the plurality of operating conditions including a baseline operating condition, ii) at least one fuel cell variable correlated to fuel cell performance, and iii) a desired range of the at least one fuel cell variable;
   b) determining at least one baseline variable profile for the fuel cell;

c) providing a first-pass D/Deff profile for the fuel cell diffusion media;
d) applying the first-pass D/Deff profile to a computational model of the fuel cell having the baseline variable profile;
e) calculating at least one first-pass variable profile resulting from the application of the first-pass D/Deff profile to the computational model;
f) comparing the first-pass variable profile to the desired range of the variable;
g) refining the first-pass D/Deff profile if the first-pass variable is not within the desired range, and repeating the steps d) to f) until the first-pass variable profile is within the desired range, wherein a second-pass D/Deff profile is provided;
h) determining a plurality of second-pass variable profiles with the second-pass D/Deff profile;
i) comparing a relative performance of the fuel cell with the second-pass variable profile and the first-pass variable profile; and
j) refining the first-pass D/Deff profile if the performance of the fuel cell with the second-pass variable profile is less desirable than the performance of the fuel cell with the first-pass variable profile, and repeating the steps d) to i) until the fuel cell having the second-pass variable profile has a superior fuel cell performance, wherein an effective D/Deff profile for the fuel cell diffusion media is provided.

2. The method of claim 1, wherein the baseline variable profile is the spatial variation of the fuel cell variable across a length of the fuel cell, the fuel cell having a uniform D/Deff profile under the baseline operation condition.

3. The method of claim 1, wherein the baseline variable profile is measured from the fuel cell employing a substantially uniform D/Deff profile under the baseline operating condition.

4. The method of claim 1, wherein the baseline variable profile is calculated from a computational model of the fuel cell with a substantially uniform D/Deff profile under the baseline operating condition.

5. The method of claim 1, wherein the second-pass variable profiles result from an application of the second-pass D/Deff profile to the computational model of the fuel cell under the plurality of operating conditions.

6. The method of claim 1, wherein the second-pass variable profiles result from measurements of the fuel cell employing the second-pass D/Deff profile under the plurality of operating conditions.

7. The method of claim 1, wherein the plurality of operating conditions for the fuel cell in the vehicle are representative of a vehicle drive cycle.

8. The method of claim 1, wherein the at least one fuel cell variable includes relative humidity (RH), current density (CD), and high-frequency resistance (HFR).

9. The method of claim 1, wherein the computational model is a multidimensional fuel cell model.

10. The method of claim 9, wherein the computational model employs a computational fluid dynamics (CFD) code.

11. The method of claim 1, wherein the step f) includes: comparing at least one of a voltage, a relative humidity range ($RH_{max}$ minus $RH_{min}$), a current density range ($CD_{max}$ minus $CD_{min}$), and a high-frequency resistance range ($HFR_{max}$ minus $HFR_{min}$) of the fuel cell having the first-pass D/Deff profile to the desired variable range.

12. The method of claim 1, wherein the diffusion media is at least one of a gas diffusion media (GDM), a microporous layer (MPL), and a vapor barrier layer (VBL).

13. The method of claim 1, wherein the baseline operating condition is the fuel cell at a temperature of about 80° C., a pressure of about 1.5 bar, an inlet relative humidity (RH) of about 25 percent, and a stoichiometry (A/C) of about 1/5/2.

14. The method of claim 1, wherein the effective D/Deff profile provides a substantially uniform relative humidity (RH) across a length of the fuel cell.

15. The method of claim 1, wherein the effective D/Deff profile provides a substantially uniform current density (CD) across a length of the fuel cell.

16. The method of claim 1, wherein the effective D/Deff profile provides a substantially uniform swelling of a polymer-electrolyte membrane across a length of the fuel cell.

17. The method of claim 1, wherein the diffusion media with the effective D/Deff profile on a cathode side of the fuel cell has a greater D/Deff at a cathode inlet region than at a cathode outlet region of the fuel cell.

18. A method for optimizing a fuel cell diffusion media having a spatially varying mass transport resistance, the method comprising the steps of:
a) identifying i) a plurality of operating conditions for a fuel cell in a vehicle, the plurality of operating conditions including a baseline operating condition, ii) at least one fuel cell variable correlated to fuel cell performance, and iii) a desired range of the at least one fuel cell variable;
b) determining at least one baseline variable profile for the fuel cell;
c) providing a first-pass D/Deff profile for the fuel cell diffusion media;
d) applying the first-pass D/Deff profile to a computational model of the fuel cell having the baseline variable profile;
e) calculating at least one first-pass variable profile resulting from the application of the first-pass D/Deff profile to the computational model;
f) comparing the first-pass variable profile to the desired range of the variable;
g) refining the first-pass D/Deff profile if the first-pass variable is not within the desired range and repeating the steps d) to f) until the first-pass variable profile is within the desired range, wherein a second-pass D/Deff profile is provided;
h) calculating a plurality of second-pass variable profiles with the second-pass D/Deff profile;
i) comparing a relative performance of the fuel cell with the second-pass variable profile and the first-pass variable profile;
j) refining the first-pass D/Deff profile if the performance of the fuel cell with the second-pass variable profile is less desirable than the performance of the fuel cell with the first-pass variable profile, and repeating the steps d) to i) until the fuel cell having the second-pass variable profile has a superior fuel cell performance, wherein an effective D/Deff profile for the fuel cell diffusion media is provided.

19. A method for optimizing a fuel cell diffusion media having a spatially varying mass transport resistance, the method comprising the steps of:
a) identifying i) a plurality of operating conditions for a fuel cell in a vehicle, the plurality of operating conditions including a baseline operating condition, ii) at least one fuel cell variable correlated to fuel cell performance, and iii) a desired range of the at least one fuel cell variable;
b) preparing the fuel cell having a uniform D/Deff profile under the baseline operation condition;

c) measuring at least one baseline variable profile of the fuel cell;

d) providing a first-pass D/Deff profile for the fuel cell diffusion media;

e) applying the first-pass D/Deff profile to a computational model of the fuel cell having the baseline variable profile;

f) calculating at least one first-pass variable profile resulting from the application of the first-pass D/Deff profile to the computational model;

g) comparing the first-pass variable profile to the desired range of the variable;

h) refining the first-pass variable if the first-pass variable is not within the desired range and repeating the steps d) to g) until the first-pass variable profile is within the desired range, wherein a second-pass D/Deff profile is provided;

i) preparing the fuel cell having the second-pass D/Deff profile;

j) measuring a plurality of second-pass variable profiles of the fuel cell having the second-pass D/Deff profile under the plurality of operating conditions;

k) comparing a relative performance of the fuel cell with the second-pass variable profile and the first-pass variable profile;

l) refining the second-pass variable profile if the performance of the fuel cell with the second-pass variable profile is less desirable than the performance of the fuel cell with the baseline variable profile, and repeating steps d) to k) until the fuel cell having the second-pass variable profile has a superior performance, wherein an effective D/Deff profile for the fuel cell diffusion media is provided.

20. The method of claim 19, wherein the steps of preparing the fuel cell includes adjusting at least one of a thickness, a porosity, a pore-size, and a tortuosity of the diffusion media across a length of the fuel cell.

* * * * *